United States Patent
Brötje et al.

(10) Patent No.: US 7,529,306 B2
(45) Date of Patent: May 5, 2009

(54) ESTIMATION OF ASYMMETRIES BETWEEN INPHASE AND QUADRATURE BRANCHES IN MULTICARRIER TRANSMISSION SYSTEMS

(75) Inventors: Lars Brötje, Wachtberg (DE); Karl Dirk Kammeyer, Buchholz (DE); Volker Kühn, Bremen (DE); Sven Vogeler, Bremen (DE)

(73) Assignee: Infineon Technologies AG, Munich (DE)

( * ) Notice: Subject to any disclaimer, the term of this patent is extended or adjusted under 35 U.S.C. 154(b) by 597 days.

(21) Appl. No.: 11/075,208

(22) Filed: Mar. 8, 2005

(65) Prior Publication Data

US 2005/0180518 A1 Aug. 18, 2005

Related U.S. Application Data

(63) Continuation of application No. PCT/DE03/02815, filed on Aug. 22, 2003.

(30) Foreign Application Priority Data

Sep. 9, 2002 (DE) ................. 102 41 676

(51) Int. Cl.
*H04K 1/10* (2006.01)

(52) U.S. Cl. ................. 375/260; 375/346

(58) Field of Classification Search ............ 375/140, 375/145, 146, 260, 261, 268, 340, 346; 455/303–305, 455/226.1
See application file for complete search history.

(56) References Cited

U.S. PATENT DOCUMENTS

| | | | |
|---|---|---|---|
| 7,233,629 B2 * | 6/2007 | Auranen | 375/316 |
| 2005/0152482 A1 * | 7/2005 | Tubbax et al. | 375/346 |
| 2005/0180534 A1 * | 8/2005 | Brotje et al. | 375/350 |
| 2005/0276354 A1 * | 12/2005 | Su et al. | 375/326 |

FOREIGN PATENT DOCUMENTS

WO WO 02/056523 7/2002

OTHER PUBLICATIONS

IEEE Standard for Information technology 802.11a; "High-speed Physical Layer in the 5 GHz Band", 1999.
IEEE Standard for Information technology 802.11a; "Amendment 4: Further Higher Data Rate Extension in the 2.4 GHz Band", 2003.
Schuchert, Andreas; "Verfahren der digitalen Kompensation von Unsymmetrien der analogen Quadraturmischen in OFDM-Empfängern"; Motorola SPS; München Germany, Jun. 2001.
Schöps, Gerhard; "Optimierung und Referenzbildung der adaptiven Echokompensation für mehrstufige HDTV-Kabelübertrag-ungs-systeme mit quantisierter Rückkopplung und ACT-Fil-terung"; Dissertation, Lehrstuhl fur Nachrichtentechnik, Insitut for Informationstechnik of the Technischen Universität München, pp. 76-97, 1995.

(Continued)

*Primary Examiner*—Chieh M Fan
*Assistant Examiner*—Jaison Joseph
(74) *Attorney, Agent, or Firm*—Dicke, Billig & Czaja, PLLC

(57) ABSTRACT

Distortions of radio signals transmitted in data blocks in an OFDM method, the distortions being caused by IQ asymmetries, can be estimated and subsequently equalized by means of specific reference data symbols which are transmitted at the transmitter end and may be part of a preamble. The method can be used particularly advantageously in a direct-mixing receiver.

21 Claims, 2 Drawing Sheets

OTHER PUBLICATIONS

Schuchert, Andreas; "A Novel IQ imbalance compensation scheme for the reception of OFMD signals", IEEE Transactions on Consumer Electronics, IEEE Inc., New York, pp. 313-318, Aug. 2001.

Wikimedia Foundation, Inc., "HIPERLAN/2", Technical Standard, Wikipedia(R), 2 pages, May 23, 2008.

* cited by examiner

ESTIMATION OF ASYMMETRIES BETWEEN INPHASE AND QUADRATURE BRANCHES IN MULTICARRIER TRANSMISSION SYSTEMS

CROSS-REFERENCE TO RELATED APPLICATION

This application is a continuation of copending International Application No. PCT/DE03/02815 filed Aug. 22, 2003 which designates the United States, and claims priority to German application no. 102 41 676.1 filed Sep. 9, 2002.

TECHNICAL FIELD

Embodiments relate to a method for the estimation of the distortion of radio signals that is caused by IQ asymmetries, which radio signals are transmitted in data blocks in a multi-carrier transmission method, and to a method for the equalization of the error caused by IQ asymmetries.

BACKGROUND

Within the European DVB (digital video broadcasting) system, digital transmission systems for satellite (DVB-S), for cable (DVB-C) and for terrestrial digital broadcasting transmission (DVB-T) have been developed and corresponding specifications have been elaborated therefor. On account of the problematic transmission conditions present on the terrestrial radio channel, the transmission method that has been prescribed in the DVB-T specification is the OFDM transmission method (orthogonal frequency division multiplexing), which can effectively combat the difficult transmission conditions.

A further important area of application for the OFDM transmission method is in high-rate wireless data transmission networks such as, for example, WLAN (wireless local area network), in particular the transmission methods defined in the standards IEEE802.11a and 11 g and also HIPERLAN/2.

The OFDM transmission method is a multicarrier transmission method in which the data stream is divided between a number of parallel (orthogonal) subcarriers that are in each case modulated with a correspondingly low data rate. As is illustrated in FIG. 1, (sub-) carrier frequencies are arranged such that they are spaced apart equidistantly from one another on the frequency scale within a transmission bandwidth K. The carrier frequencies lie on both sides of and symmetrically with respect to a center frequency $f_c$. In the time domain, an OFDM symbol results from the superposition of all K carrier frequencies. The data transmission is effected in the form of frames or bursts, a frame containing a uniform number of OFDM symbols.

The reception and the demodulation of OFDM radio signals may be effected by conventional reception concepts based on the principle of heterodyne reception with subsequent digital quadrature mixing. However, primarily for reasons of lower power consumption and avoiding chip-external filters for image frequency suppression, preference is increasingly being given to more advanced reception concepts employing direct-mixing methods. In the case of direct-mixing receiver concepts, the radio signal that is received via an antenna and amplified is split into an inphase (I) and a quadrature (Q) branch and mixed with the output frequency of a local oscillator in both branches, the oscillator frequencies fed to the mixers being shifted reciprocally by 90° by means of a phase shifter. Consequently, the quadrature demodulation for recovering the information-carrying baseband signals is implemented using analog circuit technology in this reception concept.

Technology-dictated inaccuracies in the production process and non-idealities of the analog mixers and oscillators and also deviations between the filters in the I and Q branches give rise to so-called IQ asymmetries or IQ distortions, i.e. amplitude and phase asymmetries between the quadrature components. The real and imaginary parts of the complex baseband signal are not phase-shifted by exactly 90° relative to one another and amplitude deviations between I branch and Q branch further occur. Such IQ asymmetries may occur both in the transmitter and in the receiver. In the receiver, the IQ asymmetries in the case of OFDM based transmission systems, in the frequency domain, that is to say after the FFT transformation (Fast Fourier Transform) in the receiver, lead to a reciprocal interference between in each case two data symbols on the subcarriers whose frequencies are arranged symmetrically with respect to the center frequency $f_c$ of the OFDM spectrum (indicated hereinafter by the subcarrier indices n and −n). Each data symbol transmitted on the subcarrier n generates a signal contribution on the subcarrier with the index −n (image frequency) as a result of the IQ asymmetry added in the time domain. The superposition leads to distortions of the useful signals at the positions n and −n.

In the dissertation "Verfahren der digitalen Kompensation von Unsymmetrien der analogen Quadraturmischung in OFDM-Empfängern [Method for the digital compensation of asymmetries of the analog quadrature mixing in OFDM receivers]" by Andreas Schuchert, accepted by the faculty of electrical engineering and information technology at the Bergischen Universität-Gesamthochschule Wuppertal, chapter 4 gave a mathematical description of the IQ asymmetries and supplied a quantitative estimation of the interference contribution occurring at the image frequency of a desired signal. Chapter 6 of the aforementioned dissertation proposes two different methods for IQ error compensation by frequency domain equalization. The first method proposed therein enables a separate frequency-dependent compensation of IQ asymmetries. For the detection of the equalization parameters by means of an IQ error detector, it is also proposed to utilize the pilot carriers that are transmitted for the purpose of estimating the channel transfer function as training symbols for the purpose of estimating the IQ distortions. However, the circuit arrangements—provided for error compensation—of both methods presented have a relatively large number of function blocks and are thus characterized by a high implementation outlay.

WO 02/056523 discloses a further method by means of which transmitter- and receiver-end IQ asymmetries can be eliminated. This method is based on generating compensation signals corresponding to the IQ errors and using them for the compensation.

SUMMARY

One embodiment provides a method for the estimation of the distortion of radio signals that is caused by IQ asymmetries, comprising transmitting radio signals in data blocks in a multicarrier transmission method with subcarriers n and sub-carriers −n arranged symmetrically with respect to the latter in the transmission spectrum with regard to a center frequency $f_c$, which data blocks in each case contain a number of data symbols d composed of subcarrier symbols $d_{n/-n}$, wherein each data block contains two reference data symbols that succeed one another at instants i, i−1, wherein during the reference data symbols with regard to each subcarrier pair n/–n, the transmitted data symbol on one subcarrier remains temporally constant, while that on the respective other subcarrier changes sign, and wherein the distortion parameters are calculated from the received subcarrier symbols.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

An exemplary embodiment of the method is explained in more detail below with reference to the figures of the drawing, in which:

FIG. 2 illustrates a conventional PLCP preamble according to the OFDM standard IEEE 802.11a;

DETAILED DESCRIPTION

Figure 1:
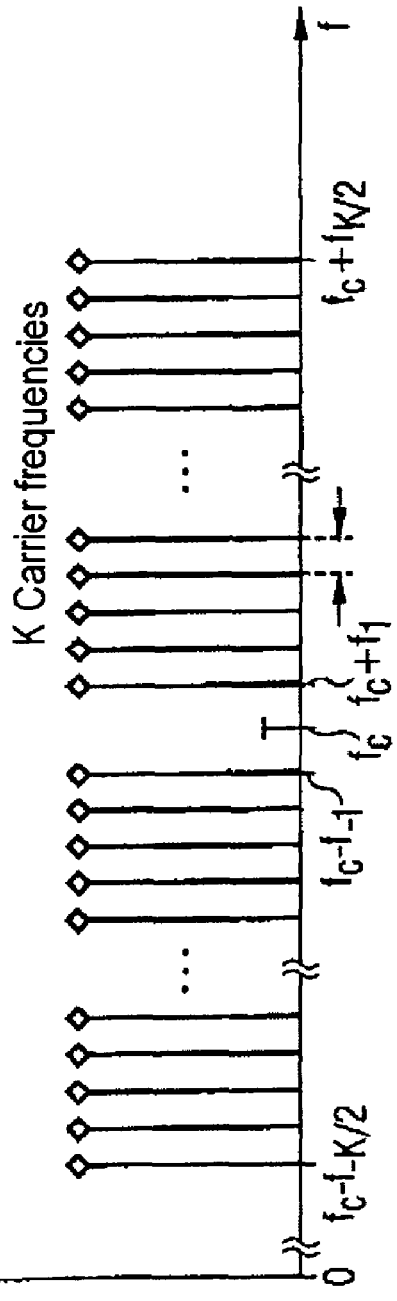
FIG. 1 illustrates the frequency spectrum of the OFDM transmission method.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One embodiment provides a method for the estimation and subsequent equalization of the distortion of radio signals that is caused by IQ asymmetries in multicarrier transmission systems, in particular OFDM transmission systems, which method can be implemented with a lower outlay.

One embodiment provides a method for the estimation of the distortion of radio signals that is caused by IQ asymmetries, comprising transmitting radio signals in data blocks in a multicarrier transmission method with subcarriers n and subcarriers –n arranged symmetrically with respect to the latter in the transmission spectrum with regard to a center frequency $f_c$, which data blocks in each case contain a number of data symbols d composed of subcarrier symbols $d_{n/-n}$, wherein each data block contains two reference data symbols that succeed one another at instants i, i–1, wherein during the reference data symbols with regard to each subcarrier pair n/–n, the transmitted data symbol on one subcarrier remains temporally constant, while that on the respective other subcarrier changes sign, and wherein the distortion parameters are calculated from the received subcarrier symbols.

Embodiments provide a method for the estimation of the distortion of radio signals that is caused by IQ asymmetries, which radio signals are transmitted in the form of data blocks (also referred to as frames or bursts) in a multicarrier transmission method. The method can be employed in all those areas in which multicarrier transmission methods can be used, that is to say e.g. in the area of wireless data transmission networks (WLAN) or in the area of digital terrestrial video or audio signal transmission. One known multicarrier transmission method is for example the OFDM method already described above. The spectrum of the multicarrier transmission method contains subcarriers n and subcarriers –n arranged spectrally symmetrically with respect to the latter with regard to a center frequency $f_c$.

Embodiments provide each data block with specific so-called reference data symbols at the transmitter end, said reference data symbols being known to the receiver, and in calculating the distortion parameters from the received and distorted reference data symbols. What are involved in this case are two reference data symbols that temporally succeed one another and for which the condition holds true that, during the reference data symbols with regard to each subcarrier pair n/–n, the transmitted data symbol on one subcarrier remains temporally constant, while that on the respective other subcarrier changes sign. The distortion parameters can subsequently be calculated from the received subcarrier symbols.

The following conditions thus hold true $$d_n(i) = -d_n(i-1) \text{ and}$$

$$d_{-n}(i) = d_{-n}(i-1) \quad (1.1)$$

or $$d_n(i) = d_n(i-1) \text{ and}$$

$$d_{-n}(i) = -d_{-n}(i-1) \quad (1.2)$$

for all subcarrier pairs n/–n, where i, i–1 are the instants of the reference data symbols.

The type of modulation for the reference data symbols on the subcarriers may be a different type than the type of modulation for the payload data symbols. For reliable transmission of the reference data, it is expedient to use an interference-insensitive type of modulation for the reference data symbols on the subcarriers, such as, by way of example, a BPSK modulation (binary phase shift keying), in the case of which the subcarriers respectively have two different phase angles which are shifted by 180° relative to one another and are designated by 1, –1 in the symbol alphabet, so that $d_{n/-n}(i) \in \{-1; 1\}$. A phase angle thus determines the signal profile on a subcarrier of a symbol. The information transmitted on a subcarrier is in this case defined by the absolute phase angle (coherent method). In the case of a D-BPSK modulation, by contrast, the information is contained in the phase difference between the data symbols transmitted on the same subcarrier of two symbols that temporally succeed one another (incoherent method).

The kind of modulation of the payload signals contained in the data block is independent of the previously described modulation of the data symbols on the subcarriers of the reference data symbols. Consequently, any other desired type of modulation may also be used for the modulation of the payload data.

The reference data symbols are advantageously a part of the preamble that is present anyway in the transmitted data blocks, which preamble may also contain other data symbols which can be used in the receiver for example for synchronization purposes. A preamble always comprises a sequence of data symbols which, according to the literal meaning, are arranged temporally at the foremost position of the data block. However, so-called midambles are also known in the prior art; these are transmitted approximately in the center of a data block and are arranged temporally between payload data signals in the data block. The construction of the data blocks and the classification of the reference data symbols therein are unimportant, in principle, to certain embodiments. The reference data symbols according to embodiments may thus theoretically also be incorporated into the data block as part of a midamble.

As has already been described above, the distortion includes an interference between subcarriers situated mirror-symmetrical on both sides of the center frequency of the multicarrier spectrum. This distortion is caused by transmitter- and/or receiver-end IQ asymmetries. Furthermore, the multipath propagation of the radio channel results in linear distortions of the subcarrier considered. The overall distortion composed of the IQ distortion and the channel distortion can be modeled by the following equation:

$$\begin{bmatrix} \hat{d}'_n(i) \\ \hat{d}'^*_{-n}(i) \end{bmatrix} = \underbrace{\begin{bmatrix} a_n^{RX} & b_n^{RX} \\ b_{-n}^{RX*} & a_{-n}^{RX*} \end{bmatrix}}_{A^{RX}} \cdot \underbrace{\begin{bmatrix} C_n & 0 \\ 0 & C^*_{-n} \end{bmatrix}}_{C} \cdot \underbrace{\begin{bmatrix} a_n^{TX} & b_n^{TX} \\ b_{-n}^{TX*} & a_{-n}^{TX*} \end{bmatrix}}_{A^{TX}} \quad (2)$$

$$\cdot \begin{bmatrix} d_n(i) \\ d^*_{-n}(i) \end{bmatrix}$$

$$= \underbrace{\begin{bmatrix} a_n & b_n \\ b^*_{-n} & a^*_{-n} \end{bmatrix}}_{A} \cdot \begin{bmatrix} d_b(i) \\ d^*_{-n}(i) \end{bmatrix}$$

In this case, $\hat{d}'_n(i)$ are the distorted symbols received at the instant i on the subcarrier n, $d_n(i)$ are the undistorted transmitted symbols, $A^{TX}$ forms the transmitter-end IQ distortion matrix, $A^{RX}$ forms the reception-end IQ distortion matrix, and C contains the channel coefficients of a multipath channel.

The distortion parameters contained in the matrix A are thus estimated by means of the method according to embodiments. As a result of placing a preamble in front at the transmitter end with the reference symbols $d_n(i)$ according to embodiments on the subcarriers, it is possible, assuming that the channel remains approximately constant for two OFDM symbols that succeed one another (the assumption is always justified for the elements of the IQ distortion matrices $A^{TX}$ and $A^{RX}$), to formulate the above distortion equation for the instants i−1 (1st preamble symbol) and i (2nd preamble symbol).

If the above system of equations (1.1) is assumed as a condition for the reference data symbols, the distortion parameters of the matrix A thus result in the following manner from the addition or subtraction of the received symbols $\hat{d}'_n(i)$:

$$a_n = 0.5 \cdot \frac{\hat{d}'_n(i) - \hat{d}'_n(i-1)}{d_n(i)} \quad (3)$$

$$b_n = 0.5 \cdot \frac{\hat{d}'_n(i) + \hat{d}'_n(i-1)}{d^*_{-n}(i)}$$

$$b_{-n} = 0.5 \cdot \frac{\hat{d}'_{-n}(i) - \hat{d}'_{-n}(i-1)}{d^*_n(i)}$$

$$a_{-n} = 0.5 \cdot \frac{\hat{d}'_{-n}(i) + \hat{d}'_{-n}(i-1)}{d_{-n}(i)}$$

By contrast, if the above system of equations (1.2) is assumed as a condition for the reference data symbols, the distortion parameters of the matrix A thus result in the following manner from the addition or subtraction of the received symbols $\hat{d}'_n(i)$:

$$a_n = 0.5 \cdot \frac{\hat{d}'_n(i) + \hat{d}'_n(i-1)}{d_n(i)} \quad (4)$$

$$b_n = 0.5 \cdot \frac{\hat{d}'_n(i) - \hat{d}'_n(i-1)}{d^*_{-n}(i)}$$

$$b_{-n} = 0.5 \cdot \frac{\hat{d}'_{-n}(i) + \hat{d}'_{-n}(i-1)}{d^*_n(i)}$$

$$a_{-n} = 0.5 \cdot \frac{\hat{d}'_{-n}(i) - \hat{d}'_{-n}(i-1)}{d_{-n}(i)}$$

The division by the transmitted preamble symbols $d_n(i)$, $d_{-n}(i)$ in the present case constitutes only a multiplication by the factor ±1 in the case of using BPSK modulation.

If only a transmitter-end IQ error is present, it is possible to separately estimate the influences of channel and IQ error with the preamble structure proposed, whereby a conventional OFDM channel equalization becomes possible after the IQ correction. Under these conditions and taking account of the approximation $a_n^{TX}, a_{-n}^{TX} \approx 1$, the following equations initially result once again assuming the above system of equations (1.1) as conditions for the reference data symbols:

$$\hat{d}'_n(i) - \hat{d}'_n(i-1) = 2 \cdot C_n \cdot d_n(i)$$

$$\hat{d}'_n(i) + \hat{d}'_n(i-1) = 2 \cdot C_n \cdot b_n^{TX} \cdot d^*_{-n}(i)$$

$$\hat{d}'_{-n}(i) - \hat{d}'_{-n}(i-1) = 2 \cdot C_{-n} \cdot b_{-n}^{TX} \cdot d^*_n(i)$$

$$\hat{d}'_{-n}(i) + \hat{d}'_{-n}(i-1) = 2 \cdot C_{-n} \cdot d_{-n}(i) \quad (5.1)$$

The IQ distortion parameters can be calculated therefrom:

$$b_n^{TX} = \frac{\hat{d}'_n(i) + \hat{d}'_n(i-1)}{\hat{d}'_n(i) - \hat{d}'_n(i-1)} \cdot \frac{d_n(i)}{d^*_{-n}(i)} \quad (5.2)$$

$$b_{-n}^{TX} = \frac{\hat{d}'_{-n}(i) - \hat{d}'_{-n}(i-1)}{\hat{d}'_{-n}(i) + \hat{d}'_{-n}(i-1)} \cdot \frac{d_{-n}(i)}{d^*_n(i)}$$

In this case, too, when using a BPSK modulation for the reference symbols $d_n$ and $d_{-n}$, the multiplication by $d_n(i)/d^*_{-n}(i)$ and $d_{-n}(i)/d^*_n(i)$ is only a weighting with ±1.

By contrast, if the above system of equations (1.2) is assumed as conditions for the reference data symbols, the following equations result:

$$\hat{d}'_n(i) - \hat{d}'_n(i-1) = 2 \cdot C_n \cdot b_n^{TX} \cdot d^*_{-n}(i)$$

$$\hat{d}'_n(i) + \hat{d}'_n(i-1) = 2 \cdot C_n \cdot d_n(i)$$

$$\hat{d}'_{-n}(i) - \hat{d}'_{-n}(i-1) = 2 \cdot C_{-n} \cdot d_{-n}(i)$$

$$\hat{d}'_n(i) + \hat{d}'_n(i-1) = 2 \cdot C_{-n} \cdot b_n^{TX} \cdot d_n(i) \quad (6.1)$$

The IQ distortion parameters can be calculated therefrom $$b_n^{TX} = \frac{\hat{d}'_n(i) - \hat{d}'_n(i-1)}{\hat{d}'_n(i) + \hat{d}'_n(i-1)} \cdot \frac{d_n(i)}{d^*_{-n}(i)} \quad (6.2)$$

$$b_{-n}^{TX} = \frac{\hat{d}'_{-n}(i) + \hat{d}'_{-n}(i-1)}{\hat{d}'_{-n}(i) - \hat{d}'_{-n}(i-1)} \cdot \frac{d_{-n}(i)}{d^*_n(i)}$$

In this case, too, when using a BPSK modulation for the reference symbols $d_n$ and $d_{-n}$, the multiplication by $d_n(i)/d_{-n}^*(i)$ and $d_{-n}(i)/d_n^*(i)$ is only a weighting with ±1.

Figure 2:
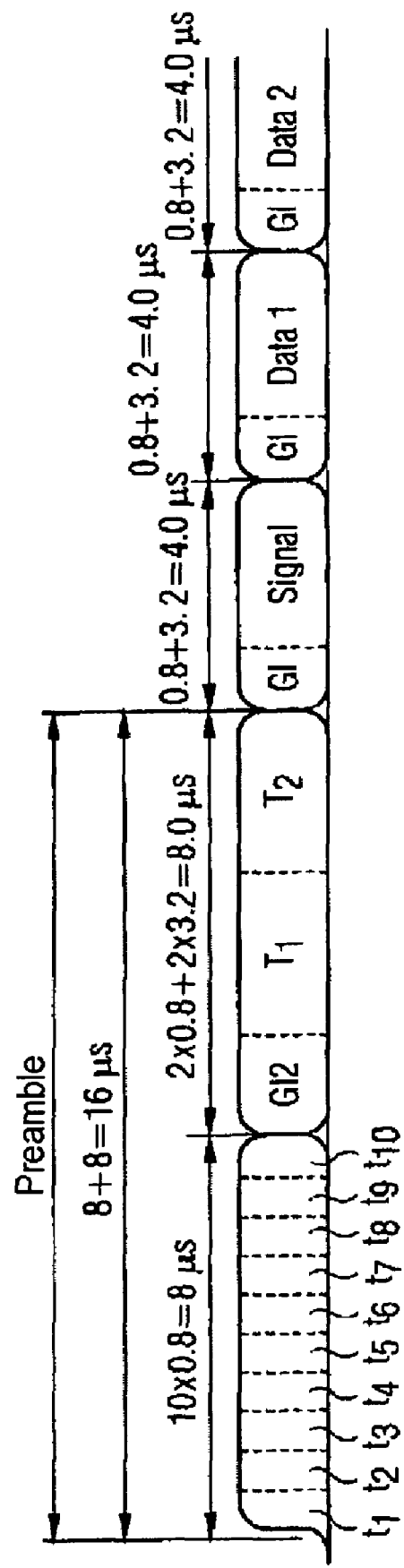

FIG. 2 illustrates a section of a data block transmitted according to the OFDM standard IEEE 802.11a at the transmitter end, the temporal beginning of which lies at the left-hand end and which continues toward the right on the time axis and the illustration of which is terminated after the second data symbol at the right-hand end. The data block has a so-called PLCP preamble (physical layer convergence protocol) known through the standard IEEE 802.11a. This standard prescribes the OFDM transmission method as the multicarrier transmission method. The payload data begin at the first OFDM symbol designated by "Data 1". Each of the OFDM symbols has a length of 3.2 μs and each OFDM symbol is preceded by a guard interval (GI) which approximately corresponds to the maximum expected duration of the impulse response of the transmission channel (here 0.8 μs).

The PLCP preamble has a length of 4 OFDM symbols and thus 16 μs in total and is divided into two sections of equal temporal length. A first section of the PLCP preamble, having a length of 8 μs, is subdivided into 10 short symbols that are used for signal detection, automatic level matching, diversity selection, coarse frequency determination and time synchronization in the receiver. The second section of the PLCP preamble comprises a GI2 guard interval (length doubled compared with GI) and 2 OFDM symbols $T_1$ and $T_2$. These data symbols serve for conventional channel estimation in the receiver in the case of the conventional PLCP preamble of FIG. 2. The symbols $T_1$ and $T_2$ are identical to one another in the conventional PLCP preamble.

In order to be able to implement the method according to embodiments, the conventional PLCP preamble can then be modified such that the condition already explained with regard to the data symbols on the subcarrier pairs n/−n are fulfilled for the symbols $T_1$ and $T_2$ that succeed one another. An embodiment is illustrated in FIG. 3.

Figure 3:
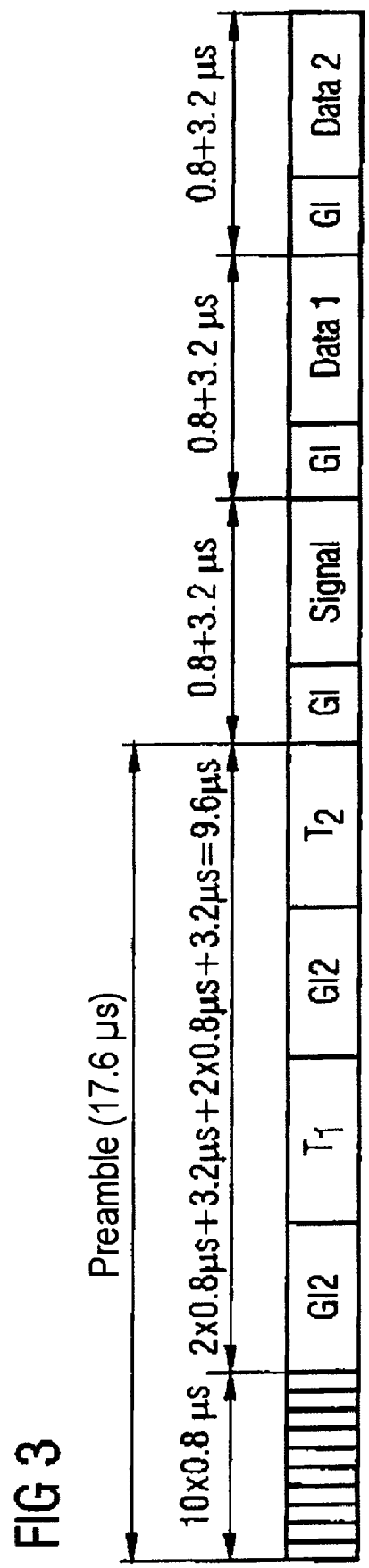
FIG. 3 illustrates an embodiment's use of reference data symbols in a preamble.

The data symbol $T_1$ of the preamble illustrated in FIG. 3 is accordingly the first preamble symbol used according to embodiments in time step i and the OFDM symbol $T_2$ is the second preamble symbol used according to embodiments in time step i−1. In this case, one of the two OFDM symbols $T_1$ and $T_2$ of the conventional PLCP preamble of FIG. 2 can be left as it is prescribed according to the standard, and the respective other one of the OFDM symbols $T_1$ and $T_2$ can then be modified in such a way that the condition according to embodiments is fulfilled. With the successive OFDM symbols $T_1$ and $T_2$ modified in this way, it is then possible, as described, for the distortion parameters of the distortion caused by the IQ error to be estimated in the receiver. Independently of this, it is possible to use the two OFDM symbols $T_1$ and $T_2$ as originally provided in the receiver for a conventional channel estimation.

Since the second OFDM symbol of the preamble (T2) now no longer represents a cyclic continuation of the first (T1), a long guard interval (GI2) has to be inserted before T2, as is shown in FIG. 3.

In the receiver, according to one method embodiment, the distortion parameters may firstly be estimated and subsequently be used in a targeted manner for an equalization. The equalization may be carried out for example in the digital signal processor (DSP). For each subcarrier pair, the matrix A may be inverted and multiplied by the vector of the received data symbols in order to obtain the vector of the transmitted data symbols (see equation 1.1).

Embodiments can generally be applied to those receiver concepts in which a branching of the received input signal between an I and Q branch is performed whilst still in the analog circuit part of the receiver. One application of embodiments thus relates to a so-called direct-mixing receiver known per se, as is shown for example in FIG. 3.5 of the dissertation by Schuchert cited in the introduction. However, embodiments can equally be applied, in principle, to a heterodyne receiver with a direct-mixing second stage that is equally known per se, as is shown for example in FIG. 3.6 of the aforementioned dissertation and is described in the associated text. Such a heterodyne receiver with a direct-mixing second stage is a modification of a heterodyne receiver in which the second mixing stage is embodied as a direct-mixing analog quadrature receiver.

The IQ errors described in the introduction can occur in such a receiver, too, and can be estimated and equalized by means of the method according to embodiments.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for the estimation of the distortion of radio signals that is caused by inphase and quadrature (IQ) asymmetries, comprising the step of:

transmitting radio signals in data blocks in a multicarrier transmission method with subcarriers n and subcarriers −n, wherein in the transmission spectrum subcarriers n and −n are arranged symmetrically with respect to a center frequency fc, which data blocks each contain a number of data symbols d composed of subcarrier symbols $d_n$ and $d_{-n}$, wherein each data block contains two reference data symbols that succeed one another at instants i, i−1, during the reference data symbols with regard to each subcarrier pair n/−n, the transmitted data symbol on one subcarrier remains temporally constant, while that on the respective other subcarrier changes sign, and wherein the distortion parameters are calculated from the received subcarrier symbols.

2. The method as claimed in claim 1, wherein the distortion is modeled by the equation $$\begin{bmatrix} \hat{d}'_n(i) \\ \hat{d}'^*_{-n}(i) \end{bmatrix} = \underbrace{\begin{bmatrix} a_n^{RX} & b_n^{RX} \\ b_{-n}^{RX*} & a_{-n}^{RX*} \end{bmatrix}}_{A^{RX}} \cdot \underbrace{\begin{bmatrix} C_n & 0 \\ 0 & C^*_{-n} \end{bmatrix}}_{C} \cdot \underbrace{\begin{bmatrix} a_n^{TX} & b_n^{TX} \\ b_{-n}^{TX*} & a_{-n}^{TX*} \end{bmatrix}}_{A^{TX}} \cdot \begin{bmatrix} d_n(i) \\ d^*_{-n}(i) \end{bmatrix}$$

$$= \underbrace{\begin{bmatrix} a_n & b_n \\ b^*_{-n} & a^*_{-n} \end{bmatrix}}_{A} \cdot \begin{bmatrix} d_b(i) \\ d^*_{-n}(i) \end{bmatrix}$$

wherein d'$_n$(i) are the distorted symbols received at the instant i on the subcarrier n, d$_n$(i) are the undistorted transmitted symbols, A$^{TX}$ is the transmitter-end IQ distortion matrix, A$^{RX}$ is the reception-end IQ distortion matrix, and C is the distortion matrix of the multipath channel.

3. The method as claimed in claim 2, wherein
assuming d$_n$(i)=−d$_n$(i−1) and d$_{-n}$(i)=d$_{-n}$(i−1) for all subcarrier pairs n/−n and a channel that is approximately constant for two data symbols that succeed one another, the distortion parameters of the matrix A are calculated as $$a_n = 0.5 \cdot \frac{\hat{d}'_n(i) - \hat{d}'_n(i-1)}{d_n(i)}$$

$$b_n = 0.5 \cdot \frac{\hat{d}'_n(i) + \hat{d}'_n(i-1)}{d^*_{-n}(i)}$$

$$b_{-n} = 0.5 \cdot \frac{\hat{d}'_{-n}(i) - \hat{d}'_{-n}(i-1)}{d^*_n(i)}$$

$$a_{-n} = 0.5 \cdot \frac{\hat{d}'_{-n}(i) + \hat{d}'_{-n}(i-1)}{d_{-n}(i)}.$$

4. The method as claimed in claim 2, wherein
assuming d$_n$(i)=d$_n$(i−1) and d$_{-n}$(i)=−d$_{-n}$(i−1) for all subcarrier pairs n/−n and a channel that is approximately constant for two data symbols that succeed one another, the distortion parameters of the matrix A are calculated as $$a_n = 0.5 \cdot \frac{\hat{d}'_n(i) + \hat{d}'_n(i-1)}{d_n(i)}$$

$$b_n = 0.5 \cdot \frac{\hat{d}'_n(i) - \hat{d}'_n(i-1)}{d^*_{-n}(i)}$$

$$b_{-n} = 0.5 \cdot \frac{\hat{d}'_{-n}(i) + \hat{d}'_{-n}(i-1)}{d^*_n(i)}$$

$$a_{-n} = 0.5 \cdot \frac{\hat{d}'_{-n}(i) - \hat{d}'_{-n}(i-1)}{d_{-n}(i)}.$$

5. The method as claimed in claim 2, wherein
for the case where d$_n$(i)=−d$_n$(i−1) and d$_{-n}$(i)=d$_{-n}$(i−1) for all subcarrier pairs n/−n and only a transmitter-end IQ asymmetry is present, the distortion parameters are calculated as $$b_n^{TX} = \frac{\hat{d}'_n(i) + \hat{d}'_n(i-1)}{\hat{d}'_n(i) - \hat{d}'_n(i-1)} \cdot \frac{d_n(i)}{d^*_{-n}(i)}$$

$$b_{-n}^{TX} = \frac{\hat{d}'_{-n}(i) - \hat{d}'_{-n}(i-1)}{\hat{d}'_{-n}(i) + \hat{d}'_{-n}(i-1)} \cdot \frac{d_{-n}(i)}{d^*_n(i)}.$$

6. The method as claimed in claim 2, wherein
for the case where d$_n$(i)=d$_n$(i−1) and d$_{-n}$(i)=−d$_{-n}$(i−1) for all subcarrier pairs n/−n and only a transmitter-end IQ asymmetry is present, the distortion parameters are calculated as $$b_n^{TX} = \frac{\hat{d}'_n(i) - \hat{d}'_n(i-1)}{\hat{d}'_n(i) + \hat{d}'_n(i-1)} \cdot \frac{d_n(i)}{d^*_{-n}(i)} \quad (6.2)$$

$$b_{-n}^{TX} = \frac{\hat{d}'_{-n}(i) + \hat{d}'_{-n}(i-1)}{\hat{d}'_{-n}(i) - \hat{d}'_{-n}(i-1)} \cdot \frac{d_{-n}(i)}{d^*_n(i)}.$$

7. The method as claimed in claim 1, wherein
the reference data symbols are transmitted as part of a preamble of the data block.

8. The method as claimed in claim 1, wherein
the multicarrier transmission method is an orthogonal frequency division multiplexing (OFDM) method.

9. The method as claimed in claim 1, wherein
the reference data symbols are modulated according to a BPSK or D-BPSK modulation method.

10. A method for the equalization of the distortion of mobile radio signals that is caused by IQ asymmetries, comprising a method for estimation according to claim 1, the method for equalization comprising the steps of:
determining transmitted payload-data data symbols from received payload-data data symbols from said data blocks, and
calculating the distortion parameters from the received subcarrier symbols.

11. The method of claim 1 wherein the method is used in a direct-mixing receiver.

12. The method of claim 1 wherein the method is used in a heterodyne receiver with a direct-mixing second stage.

13. A system for the estimation of the distortion of radio signals that is caused by inphase and quadrature (IQ) asymmetries, comprising:
means for transmitting radio signals in data blocks in a multicarrier transmission method with subcarriers n and subcarriers −n, wherein in the transmission spectrum subcarriers n and −n are arranged symmetrically with respect to a center frequency fc, which data blocks each contain a number of data symbols d composed of subcarrier symbols d$_n$ and d$_{-n}$,
wherein each data block contains two reference data symbols that succeed one another at instants i, i−1,
wherein during the reference data symbols with regard to each subcarrier pair n/−n, the transmitted data symbol on one subcarrier remains temporally constant, while that on the respective other subcarrier changes sign, and
means for calculating the distortion parameters from the received subcarrier symbols.

14. The system as claimed in claim 13, comprising means for modeling the distortion by the equation $$\begin{bmatrix} \hat{d}'_n(i) \\ \hat{d}'^*_{-n}(i) \end{bmatrix} = \underbrace{\begin{bmatrix} a_n^{RX} & b_n^{RX} \\ b_{-n}^{RX*} & a_{-n}^{RX*} \end{bmatrix}}_{A^{RX}} \cdot \underbrace{\begin{bmatrix} C_n & 0 \\ 0 & C^*_{-n} \end{bmatrix}}_{C} \cdot \underbrace{\begin{bmatrix} a_n^{TX} & b_n^{TX} \\ b_{-n}^{TX*} & a_{-n}^{TX*} \end{bmatrix}}_{A^{TX}} \cdot \begin{bmatrix} d_n(i) \\ d^*_{-n}(i) \end{bmatrix}$$

$$= \underbrace{\begin{bmatrix} a_n & b_n \\ b^*_{-n} & a^*_{-n} \end{bmatrix}}_{A} \cdot \begin{bmatrix} d_b(i) \\ d^*_{-n}(i) \end{bmatrix}$$

wherein $\hat{d}'_n(i)$ are the distorted symbols received at the instant i on the subcarrier n, $d_n(i)$ are the undistorted transmitted symbols, $A^{TX}$ is the transmitter-end IQ distortion matrix, $A^{RX}$ is the reception-end IQ distortion matrix, and C is the distortion matrix of the multipath channel.

15. The system as claimed in claim 14, comprising means for calculating, assuming $d_n(i)=-d_n(i-1)$ and $d_{-n}(i)=d_{-n}(i-1)$ for all subcarrier pairs n/−n and a channel that is approximately constant for two data symbols that succeed one another, the distortion parameters of the matrix A as:

$$a_n = 0.5 \cdot \frac{\hat{d}'_n(i) - \hat{d}'_n(i-1)}{d_n(i)}$$

$$b_n = 0.5 \cdot \frac{\hat{d}'_n(i) + \hat{d}'_n(i-1)}{d^*_{-n}(i)}$$

$$b_{-n} = 0.5 \cdot \frac{\hat{d}'_{-n}(i) - \hat{d}'_{-n}(i-1)}{d^*_n(i)}$$

$$a_{-n} = 0.5 \cdot \frac{\hat{d}'_{-n}(i) + \hat{d}'_{-n}(i-1)}{d_{-n}(i)}.$$

16. The system as claimed in claim 14, comprising means for calculating, assuming $d_n(i)=d_n(i-1)$ and $d_{-n}(i)=-d_{-n}(i-1)$ for all subcarrier pairs n/−n and a channel that is approximately constant for two data symbols that succeed one another, the distortion parameters of the matrix A as:

$$a_n = 0.5 \cdot \frac{\hat{d}'_n(i) + \hat{d}'_n(i-1)}{d_n(i)}$$

$$b_n = 0.5 \cdot \frac{\hat{d}'_n(i) - \hat{d}'_n(i-1)}{d^*_{-n}(i)}$$

$$b_{-n} = 0.5 \cdot \frac{\hat{d}'_{-n}(i) + \hat{d}'_{-n}(i-1)}{d^*_n(i)}$$

$$a_{-n} = 0.5 \cdot \frac{\hat{d}'_{-n}(i) - \hat{d}'_{-n}(i-1)}{d_{-n}(i)}.$$

17. The system as claimed in claim 14, comprising means for calculating, for the case where $d_n(i)=-d_n(i-1)$ and $d_{-n}(i)=d_{-n}(i-1)$ for all subcarrier pairs n/−n and only a transmitter-end IQ asymmetry is present, the distortion parameters as:

$$b_n^{TX} = \frac{\hat{d}'_n(i) + \hat{d}'_n(i-1)}{\hat{d}'_n(i) - \hat{d}'_n(i-1)} \cdot \frac{d_n(i)}{d^*_{-n}(i)}$$

$$b_{-n}^{TX} = \frac{\hat{d}'_{-n}(i) - \hat{d}'_{-n}(i-1)}{\hat{d}'_{-n}(i) + \hat{d}'_{-n}(i-1)} \cdot \frac{d_{-n}(i)}{d^*_n(i)}.$$

18. The system as claimed in claim 14, comprising means for calculating, for the case where $d_n(i)=d_n(i-1)$ and $d_{-n}(i)=-d_{-n}(i-1)$ for all subcarrier pairs n/−n and only a transmitter-end IQ asymmetry is present, the distortion parameters as:

$$b_n^{TX} = \frac{\hat{d}'_n(i) - \hat{d}'_n(i-1)}{\hat{d}'_n(i) + \hat{d}'_n(i-1)} \cdot \frac{d_n(i)}{d^*_{-n}(i)} \qquad (6.2)$$

$$b_{-n}^{TX} = \frac{\hat{d}'_{-n}(i) + \hat{d}'_{-n}(i-1)}{\hat{d}'_{-n}(i) - \hat{d}'_{-n}(i-1)} \cdot \frac{d_{-n}(i)}{d^*_n(i)}.$$

19. The system as claimed in claim 13, comprising means for transmitting the reference data symbols as part of a preamble of the data block.

20. The system as claimed in claim 13, wherein the multicarrier transmission method is an orthogonal frequency division multiplexing (OFDM) method.

21. The system as claimed in claim 13, wherein the reference data symbols are modulated according to a BPSK or D-BPSK modulation method.

* * * * *